US005350893A

United States Patent [19]

Yamauchi et al.

[11] Patent Number: 5,350,893

[45] Date of Patent: Sep. 27, 1994

[54] LEVER SWITCH

[75] Inventors: Kanji Yamauchi; Akio Kurihara, both of Shizuoka, Japan

[73] Assignee: Yazaki Corporation, Japan

[21] Appl. No.: 95,414

[22] Filed: Jul. 22, 1993

[30] Foreign Application Priority Data

Jul. 23, 1992 [JP] Japan ............................ 4-051950[U]

[51] Int. Cl.[5] ............................................ H01H 15/06

[52] U.S. Cl. ............................... 200/547; 200/61.027; 200/551; 200/529

[58] Field of Search ............... 200/547, 551, 558, 529, 200/553, 517, 537, 329, 330, 332.2, 337, 548, 61.27

[56] References Cited

U.S. PATENT DOCUMENTS

| | | | |
|---|---|---|---|
| 3,662,336 | 5/1972 | Suzuki et al. | 200/551 |
| 4,091,247 | 5/1978 | Gaber | 200/547 |
| 4,918,264 | 4/1990 | Yamamoto et al. | 200/517 |
| 5,147,990 | 9/1992 | Dionisio, Jr. et al. | 200/517 |

FOREIGN PATENT DOCUMENTS

| | | |
|---|---|---|
| 62-26842 | 2/1987 | Japan . |
| 279534 | 6/1990 | Japan . |
| 2137724 | 11/1990 | Japan . |

*Primary Examiner*—Henry J. Recla

*Assistant Examiner*—David J. Walczak

*Attorney, Agent, or Firm*—Wigman, Cohen, Leitner & Myers

[57] ABSTRACT

In a lever switch, a contact actuating part provided in a lever is movable in a first direction by shifting of the lever and the top portion of a movable contact is depressable in a second direction substantially at right angles to the first direction while being pressed by a pressing force caused by the movement of the contact actuating part. The lever switch includes a plate which is provided between the contact actuating part and the top portion of the movable contact to convey the pressing force to the movable contact. The top portion has a sloped face facing the contact actuating part so as to form an angle of friction $\theta$ 1 with respect to the first direction, the plate has a central part and a side part which is bent toward the contact actuating part so as to form an angle of friction $\theta$ 2 with respect to the first direction, and the angle of friction $\theta$ 2 is smaller than the angle of friction $\theta$ 1.

10 Claims, 4 Drawing Sheets

2
2
1
13
10
11
12
20
20
E
16
17

LEVER SWITCH

BACKGROUND OF THE INVENTION

The present Invention relates to a lever switch, and more particularly, to a lever switch in which a movable contact is depressed to close or turn on a switch or recovers from the depressed state relative to a fixed contact to open or turn off the switch, by shifting a lever.

In lever switches for vehicles, a type of switch has been mainly employed in which a contact is directly closed or opened to cause the switch to be turned on or off. Also, several types of electronic lever switches requiring low current have recently been utilized, while employing several types of switching forms.

In such types of lever switches, a lever switch has been provided in which movable contacts provided on a movable substrate are shifted and are directly positioned relative to fixed contacts provided on a fixed substrate by the operation of a lever, whereby specific selected circuits only are closed. In this type of lever switch, an error in the operating angle of the lever may directly result in a malfunction in the switching operation and further may cause concern about contact failures. Therefore, in this type of switch, strict dimensional accuracy is required, thereby resulting in a high cost. Furthermore, due to the above-described mechanism, considerable stroke and clearance are required, thereby resulting in relatively large element dimensions for the switch.

Another type of lever switch may be devised wherein a contact is opened or closed, for example, by converting the horizontal movement of a lever to vertical movement of a switch device. Specifically, the vertical movement may be used to vertically depress a movable contact provided facing but apart from another fixed contact. In this type of switch, since the movable contact is only depressed and recovers from the depressed state relative to the fixed contact without changing its horizontal position, strict accuracy for the positions of the contacts or the vertical movements is not required. That is, this type of lever switch does not need such very strict accuracy as the above-described lever switch. Further, this type of lever switch may have a longer stroke than the above type of lever switch. However, since it is necessary in this type of lever switch to convert horizontal movement to vertical movement in the lever switch by the stroke of the lever, a presser pin provided in the movable contact should have a sloped face by which the direction conversion is carried out when the switch is pressed. Specifically, a contact actuating part provided on the lever should press against the sloped face while sliding. Accordingly, abrasion between the contact actuating part of the lever and the sloped face is easily caused, thereby resulting in poor durability. In order to improve durability of this type of lever switch, consideration would have been given to decreasing the angle of friction, which is formed between the sloped face of the movable contact and a horizontal direction. However, the more the angle of friction is decreased, the larger switching portion is required. Namely, when the angle of friction is decreased, the contact actuating part and presser pin with the sloped face, etc., should be largely manufactured.

SUMMARY OF THE INVENTION

In view of the above, an object of the present invention is to solve the aforementioned problems in the prior art through the introduction of a lever switch which can be made small, has a greatly improved durability, and is relatively inexpensive.

The aforementioned objects of the present invention are accomplished through a lever switch comprising: a lever with an contact actuating part, said contact actuating part movable in a first direction by shifting of said lever; a movable contact with a top portion, said top portion depressable in a second direction substantially at right angles to the first direction while being pressed by a pressing force caused by movement of said contact actuating part; and a plate provided between said contact actuating part and said top portion of the movable contact to convey the pressing force to said movable contact.

In a preferred embodiment of a lever switch according to the present invention, the top portion has a sloped face facing the contact actuating part so as to form an angle of friction $\theta$ 1 with respect to the first direction, the plate has a central part and a side part which is bent toward the contact actuating part so as to form an angle of friction $\theta$ 2 with respect to the first direction, and the angle of friction $\theta$ 2 is smaller than the angle of friction $\theta$ 1.

In the above-described lever switch, since the stroke of the contact actuating part, namely the pressing force, caused by shifting the lever, is conveyed to the movable contact with the sloped face forming the angle of friction $\theta$ 2 through the plate forming the angle of friction $\theta$ 1 smaller than the angle of friction $\theta$ 2, the contact actuating part can begin pressing against the movable contact well before belong positioned on the movable contact. In other words, the pressing action of the contact actuating part with respect to the movable contact is carried out over a relatively long distance and a relatively large angle of friction. Consequently, as a result of using the plate, abrasion is substantially decreased, thereby improving the durability. Furthermore, since the stroke of the lever or the contact actuating part is effectively utilized, the lever switch can easily be made small.

BRIEF DESCRIPTION OF THE DRAWINGS

An embodiment of the present invention will be now be described in detail having reference to the accompanying drawings in which:

FIG. 4 is a sectional view taken along the line 3—3 in FIG. 2, showing the state in which a switch is turned on; and

DETAILED DESCRIPTION OF THE PREFERRED EMBODIMENTS

A lever switch E according to the present invention will be described hereinafter. In this embodiment, the ever switch E is utilized for turning on or off a turn signal lamp In a vehicle. In the following and in FIGS.

3, 4 and 5, in order to distinguish some right-turn or left-turn members or elements, R or L marks are depicted.

Figure 1:
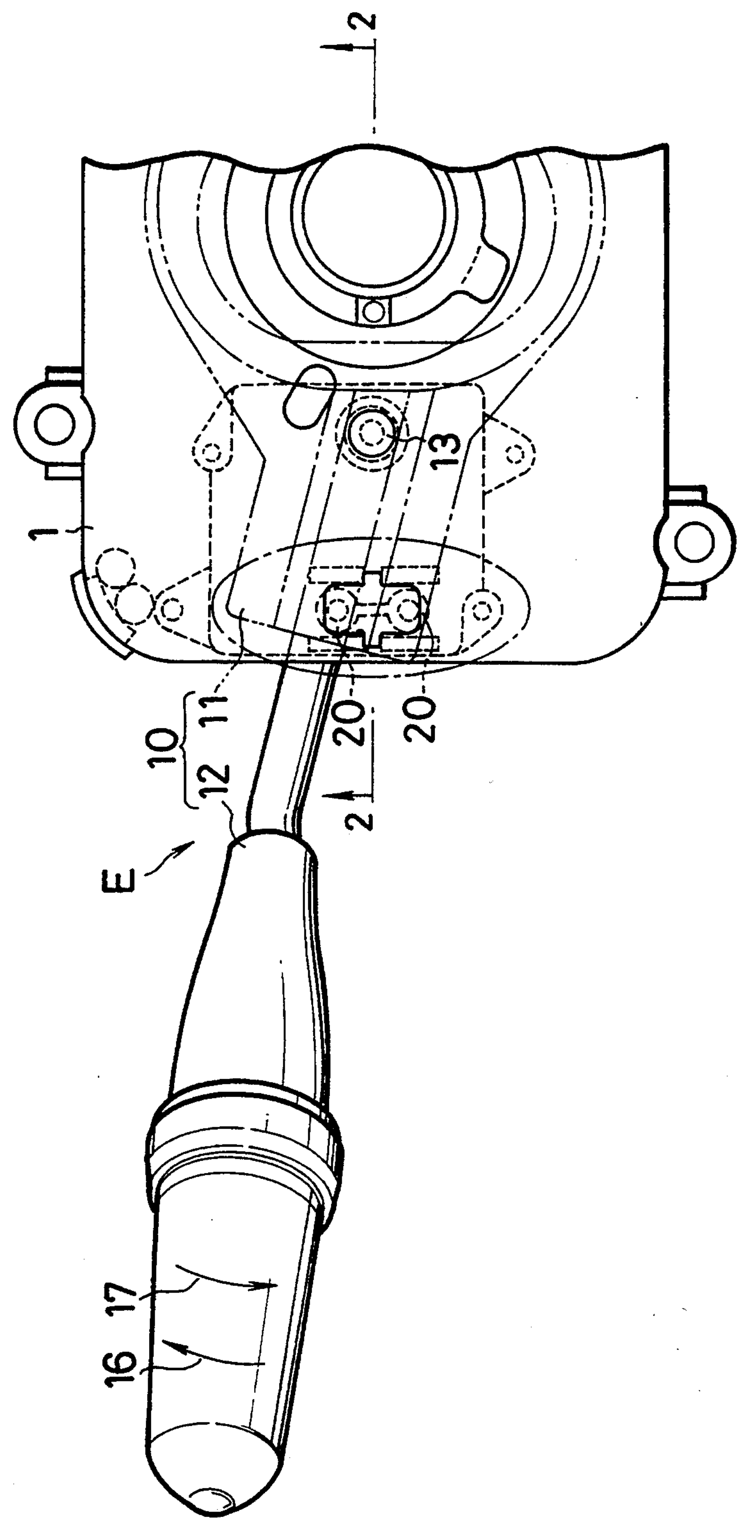
FIG. 1 is an explanatory plan view of a lever switch according to the present invention.
Figure 2:
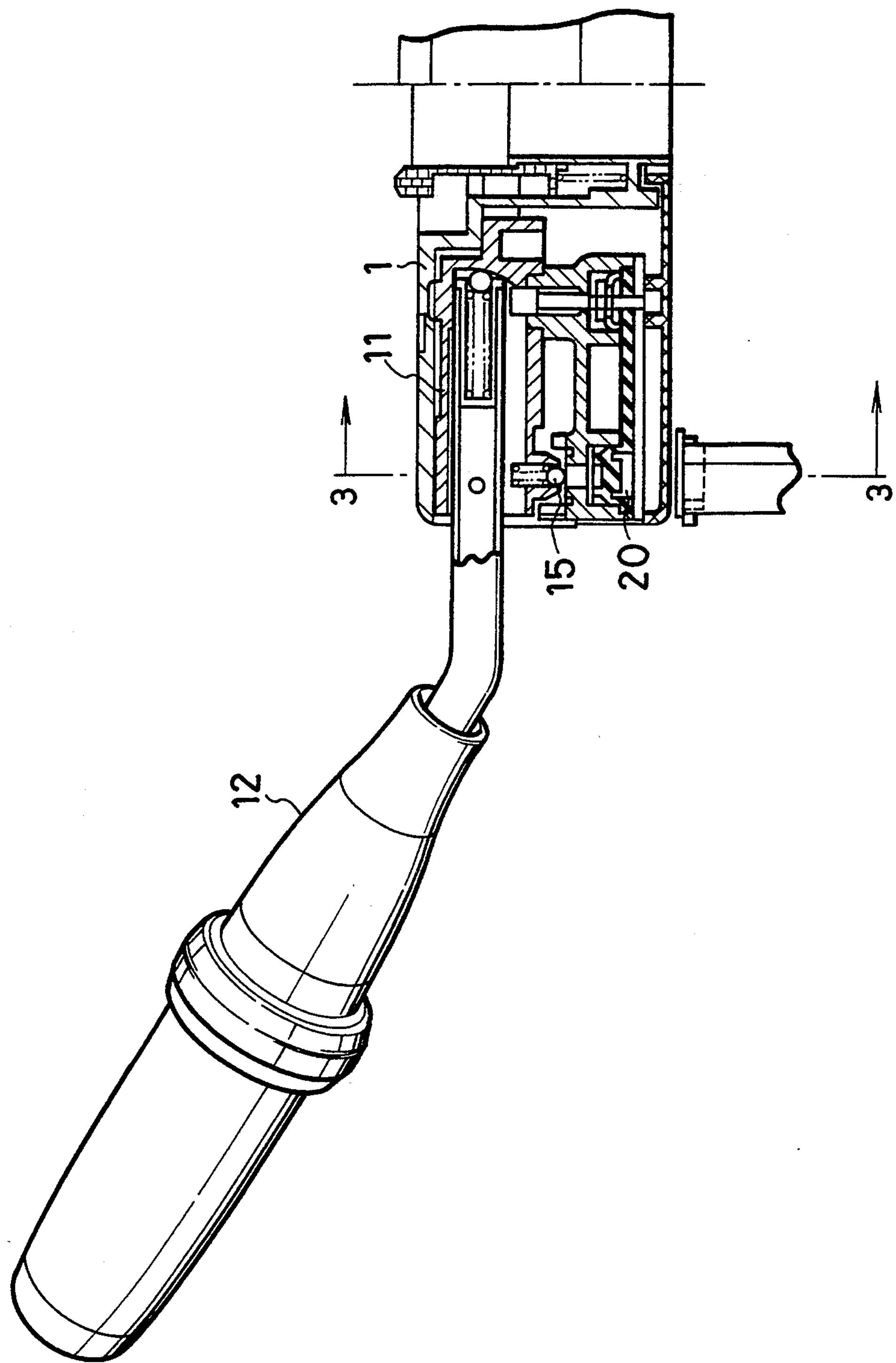
FIG. 2 is a sectional view taken along the line 2—2 in FIG. 1.
Figure 3:
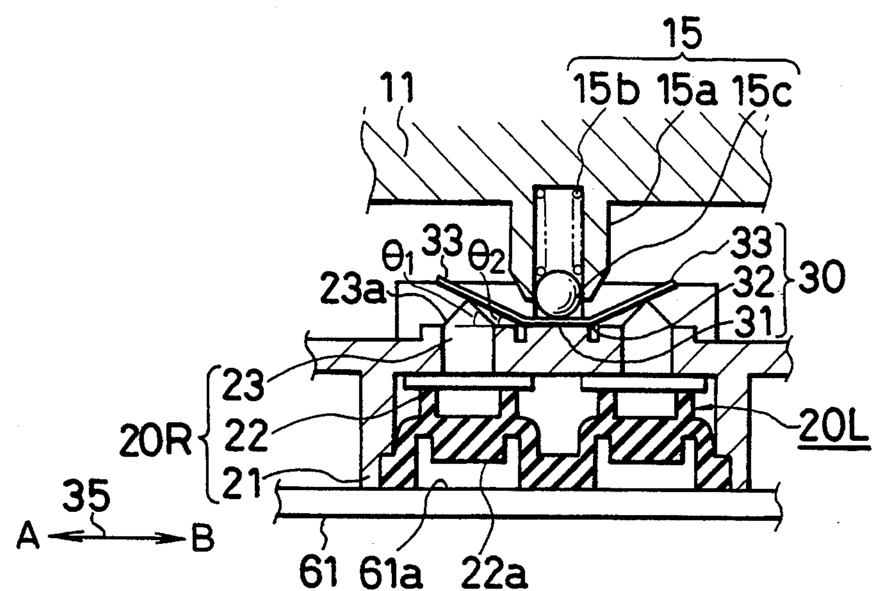
FIG. 3 is a sectional view taken along the line 3—3 in FIG. 2.
Figure 4:
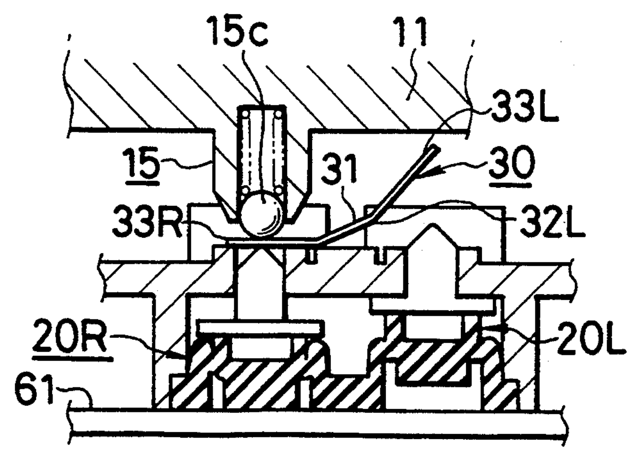

As shown in FIGS. 1 and 2, movable contacts 20 (the numeral 20R on the left side and the numeral 20L on the right side in FIGS. 3 and 4 respectively are for indicating the right-turn and the left-turn of the vehicle) are arranged in a body 1 which rotatably supports a lever 10. Also, stoppers (not shown) are arranged in the body 1 for restricting the actuated positions of the lever 10, for example, a neutral position, a left-turn position, and a right-turn position. Although other lever switches are arranged in the body 1, a detailed explanation of the other lever switches will be omitted.

The lever 10 includes a main lever part 11 rotatably supported in the body 1 and a grip 12 rotatably supported with respect to the main lever part 11 by a shaft 18. A contact actuating part 15 is provided on the main lever part 11 and projects downwards In FIG. 2.

As shown in FIGS. 3 and 4, the contact actuating part 15 includes a cylindrical guiding member 15*a*, a compressed spring 15*b* and a press-contact member 15*c*. The press-contact member 15*c* includes a ball member supported by the guiding member 15*a*. The compressed spring 15*b* is arranged inside the guiding member 15*a*. The compressed spring 15*b* is provided inside the guiding member 15*a* and exerts a force on the press-contact member 15*c* so that the press-contact member 15*c* can elastically project from and decline into the guiding member 15*a*. The lever 10 is shown in the neutral position in FIGS. 1, 2, and 3. When the lever 10 is shifted in the direction indicated by an arrow 16 or an arrow 17, a right-turn lamp or a left-turn lamp is turned on, respectively.

Fixed contacts 61*a* are formed on a fixed contact substrate or a printed wiring substrate 61. The movable contacts 20 include a supporting member 21, rubber contacts 22, and presser pins 28. The supporting member 21 is secured to the fixed contact substrate 61 and supports the rubber contacts 22, presser pins 28 and a plate 33 which will be described later. The rubber contacts 22 include contact portions 22*a* which are movable upwards and downwards in FIGS. 3 and 4.

Figure 5:
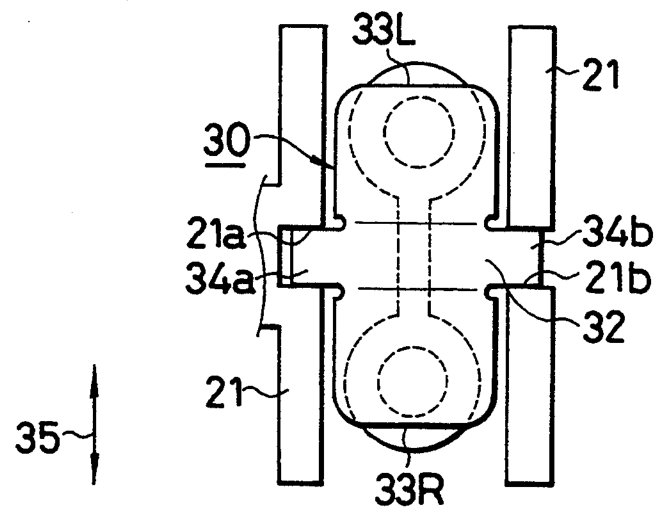
FIG. 5 is a plan view of a part of the lever switch shown in FIGS. 1-4.

The presser pins 23 respectively have sloped faces on the tops thereof. Each sloped face which faces the contact actuating part 15 forms an angle of friction $\theta$ 1 with respect to the horizontal direction as shown in FIGS. 3 and 4. The presser pins 23 are located on and abut the rubber contacts 22 and are movable upwards and downwards In FIGS. 3 and 4. That is, the presser pins 23, when pressed, decline towards the contact portions 22*a* while compressing the rubber contacts 22, whereby the contact portions 22*a* press against and contact the fixed contacts (switch portions) 61*a*. When the pressure against the presser pins 23 is released, the presser pins 23 return to a position, at which the presser pins 23 were previously positioned before being depressed, by the elastic force exerted by the rubber contacts 22. The upper part of the supporting member 21 in FIGS. 3 and 4, which is adjacent to the contact actuating part 15, is provided with supporting grooves 21*a*, 21*b* as shown in FIG. 5, which will be described later.

A plate 30 is provided between the contact actuating part 15 and the presser pins 23a of the movable contacts 20. The plate 30 has a rectangular-like shape with a central part 31 and a pair of side parts 33. Bent portions 32 are provided on the side ends of the central part 31, namely between the central part 31 and the side parts 33, while being bent and forming angles of friction $\theta$ 2 between the side parts 33 and the horizontal direction in FIGS. 3 and 4. Specifically, both side parts 33 are bent upwards in FIGS. 3 and 4 or toward the contact actuating part 15 from the central part 31 so that the angles of friction $\theta$ 2 are made smaller than the angle of friction $\theta$ 1 as shown in FIG. 3. Preferably, the angle of friction $\theta$2 is less than 45.

As shown in FIG. 3, in the state in which the central part 31 is placed on the supporting member 21 and the contact actuating part 15 is on the central part 31, both side parts 33 abut against both top portions 23*a* of the presser pins 23. As shown in FIG. 5, the central part 31 has a pair of projections 34*a*, 34*b* extending outwards. The projections 34*a*, 34*b* loosely engage the supporting member 21 in the supporting grooves 21*a*, 21*b*. Accordingly, the plate 30 is restricted to movement in the direction shown by an arrow 35 but can rotate clockwise or counterclockwise centered on the bent portion 32R or the bent portion 32L. The central part 31 contacts the press-contact member 15*c* when the press-contact member 15*c* is in the neutral position.

Next, the operation and effects of the lever switch E shown in FIGS. 1–5 will be explained below. When the vehicle is about to turn right, the lever 10 is shifted along the arrow 16. As a result, the press-contact member 15*c* slides in the direction from B to A shown by the arrow 35 in FIG. 3. When the press-contact member 15*c* reaches the bent portion 32R shown on the left side in FIG. 3, the plate 30 starts to rotate counterclockwise centered on the bent portion 32R, whereby the side part 33R shown on the eft side in FIG. 3 or 4 presses against the top portion 23aR of the presser pin 23R. Further, when the press-contact member 15*c* reaches the top center of the presser pin 23R while pressing against the plate 30 and the presser pin 23R, namely when the press-contact member 15*c* reaches the right-turn position, the presser pin 23R is depressed to its lowest position, whereby the contact portion 22*a* is pressed, declines and contacts the fixed contact 61*a* of the fixed contact substrate 61 in the rubber contact 22R. In this way, a switch for the right-turn lamp is closed or is turned on. In this situation, the side part 33L shown oil the right side in FIG. 4 is see-sawed upward according to the counterclockwise rotation of the plate 30. Since the press-contact member 15*c* includes the ball member, little friction occurs while the press-contact member 15*c* moves on and elastically presses the plate 30. Further, since pressing the presser pin 23 by the press-contact member 15*c* starts well before the press-contact member 15*c* is positioned right on the presser pin 23, that is, the plate 30 works to reduce the angle of friction, abrasion can be reduced.

What is claimed is:

1. A lever switch comprising:

a lever with a contact actuating part, said contact actuating part movable in a first direction by shifting of said lever;

a movable contact including a rigid presser pin having a top portion, said top portion depressable in a second direction substantially at right angles to the first direction while being pressed by a pressing force caused by movement of said contact actuating part; and a plate provided between said contact actuating part and said top portion of the movable contact to convey the pressing force to said movable contact, said plate having a central part and two side parts each extending from opposite sides of said central part at an apex wherein each apex defines a separate axis of rotation of the plate, said contact actuating part initially transferring said pressing force through a side part to said movable contact before said contact actuating part is positioned in opposing relationship thereto.

2. A lever switch according to claim 1, wherein said top portion has a sloped face facing said contact actuating part so as to form an angle of friction θ 1 with respect to the first direction and said plate has a central part and a side part, said central part being provided to contact said contact actuating part when said contact actuating part does not press against said top portion of the movable contact, said side part being provided to contact said contact actuating part when said contact actuating part presses said top portion of the movable contact and being bent toward said contact actuating part so as to form an angle of friction θ 2 with respect to the first direction, said angle of friction θ 2 being smaller than said angle of friction θ 1.

3. A lever switch according to claim 2, wherein said angle of friction θ 2 is less than 45°.

4. A lever switch according to claim 2, wherein said plate has a rectangular-like shape, said movable contact is supported by a supporting member with a first engaging portion, and said central part has a second engaging portion so as to engage with said first engaging portion of the supporting member so that said plate is restricted to movement In the first direction and can rotate clockwise or counterclockwise centered on a bent portion provided between the central part and side part.

5. A lever switch according to claim 4, wherein said first engaging portion has a groove and said second engaging portion has a projection.

6. A lever switch according to claim 4, wherein said supporting member is securely arranged on a substrate with a fixed contact and said movable contact is arranged on a rubber contact including a contact portion so that when the top portion of the movable contact is pressed in the second direction while compressing the rubber contact, the contact portion contacts the fixed contact and when the pressure against the top portion is released, the top portion can return to a position, at which the top portion was positioned before being depressed, by the elastic force exerted by the rubber contact.

7. A lever switch according to claim 1, wherein said press-contact member has a ball member.

8. A lever switch according to claim 7 wherein said contact actuating part includes a press-contact member, a biasing member and a guiding member, said biasing member provided inside said guiding member to press said ball member toward said plate.

9. A lever switch comprising:

a lever with a contact actuating part, said contact actuating part being movable in a first direction by shifting of said lever;

a movable contact including a rigid presser pin having a top portion with a sloped face facing said contact actuating part so as to form an angle of friction θ 1 with respect to the first direction, said presser pin being depressable in a second direction substantially at right angles to the first direction when being pressed by a pressing force caused by movement of said contact actuating part;

a plate provided between said contact actuating part and said top portion of the movable contact to convey the pressing force to said movable contacts a central part being provided in the plate, and contacting said contact actuating part when said contact actuating part does not press against said top portion of the movable contact;

a flat side part provided in the plate and located adjacent to the central part, said side part being bent toward said contact actuating part from the central part so as to form an angle of friction θ 2 with respect to the first direction, said angle of friction θ 2 being smaller than said angle of friction θ 1;

a press-contact member being provided in the contact actuating parts a guiding member provided in the contact actuating parts a biasing member being provided inside said guiding member of the contact actuating part for pressing said press-contact member toward said plate; and a supporting member engaging with and supporting the central part of the plate so that the plate can rotate clockwise or counterclockwise centered on a bent portion provided between the central part and the side part, said supporting member having a substantially flat face and a hole, said hole housing thereinside and slidably supporting the presser pin of the movable contact in the second direction, said flat face supporting the flat side part thereon between the press-contact member and the presser pin when said contact actuating part presses against the top portion of the presser pin.

10. The lever switch according to claim 9, wherein said press-contact member has a ball member.

* * * * *